(12) United States Patent
Kumon et al.

(10) Patent No.: US 7,659,868 B2
(45) Date of Patent: Feb. 9, 2010

(54) HEAD-UP DISPLAY APPARATUS AND COVER-MIRROR UNIT USED FOR THE SAME

(75) Inventors: Hitoshi Kumon, Aichi (JP); Kunimitsu Aoki, Shizuoka (JP); Yoshiyuki Furuya, Shizuoka (JP); Hideaki Kabeyama, Shizuoka (JP); Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 791 days.

(21) Appl. No.: 11/190,060

(22) Filed: Jul. 27, 2005

(65) Prior Publication Data
US 2006/0022896 A1 Feb. 2, 2006

(30) Foreign Application Priority Data
Jul. 27, 2004 (JP) ............................. 2004-218784

(51) Int. Cl.
G02B 27/14 (2006.01)
(52) U.S. Cl. ............................. 345/7; 359/630; 359/632
(58) Field of Classification Search .................... 345/7; 220/252, 253; 359/632, 630, 629
See application file for complete search history.

(56) References Cited

U.S. PATENT DOCUMENTS

| | | | | |
|---|---|---|---|---|
| 4,530,081 A | * | 7/1985 | Sakurai et al. .............. | 720/647 |
| 6,542,305 B2 | * | 4/2003 | Nakamura et al. .......... | 359/630 |
| 6,654,177 B2 | * | 11/2003 | Nakamura et al. .......... | 359/632 |
| 6,989,934 B2 | * | 1/2006 | Aoki et al. .................. | 359/629 |
| 6,992,578 B2 | * | 1/2006 | Aoki et al. .................. | 340/525 |
| 2002/0166273 A1 | * | 11/2002 | Nakamura et al. ............ | 40/593 |
| 2004/0095651 A1 | * | 5/2004 | Aoki et al. .................. | 359/630 |
| 2004/0113866 A1 | * | 6/2004 | Aoki et al. ..................... | 345/7 |

FOREIGN PATENT DOCUMENTS

| | | |
|---|---|---|
| JP | 62-200040 | 12/1987 |
| JP | 2003-237411 | 8/2003 |

* cited by examiner

*Primary Examiner*—Amare Mengistu
*Assistant Examiner*—Gene W Lee
(74) *Attorney, Agent, or Firm*—Kratz, Quintos & Hanson, LLP

(57) ABSTRACT

An object of the present invention is to provide a head-up display apparatus and a cover-mirror unit used for the same.

A movable member 3' of the cover-mirror unit stands up along a flat inner wall 1a1 of a housing 1a when the head-up display apparatus is in use, and lie down to cover an opening of the housing 1a when the head-up display apparatus is not in use for carrying out an up/down operation. In particular, through the down operation, by a link mechanism, a bottom end of the movable member is gradually moved upward by following the inner wall 1a1 of the housing 1a. Therefore, though the movable member 3' stands up along the inner wall 1a1 of the housing 1a when the head-up display apparatus is in use, the movable member 3' never interferes with the inner wall 1a1 through the up/down operation.

6 Claims, 5 Drawing Sheets

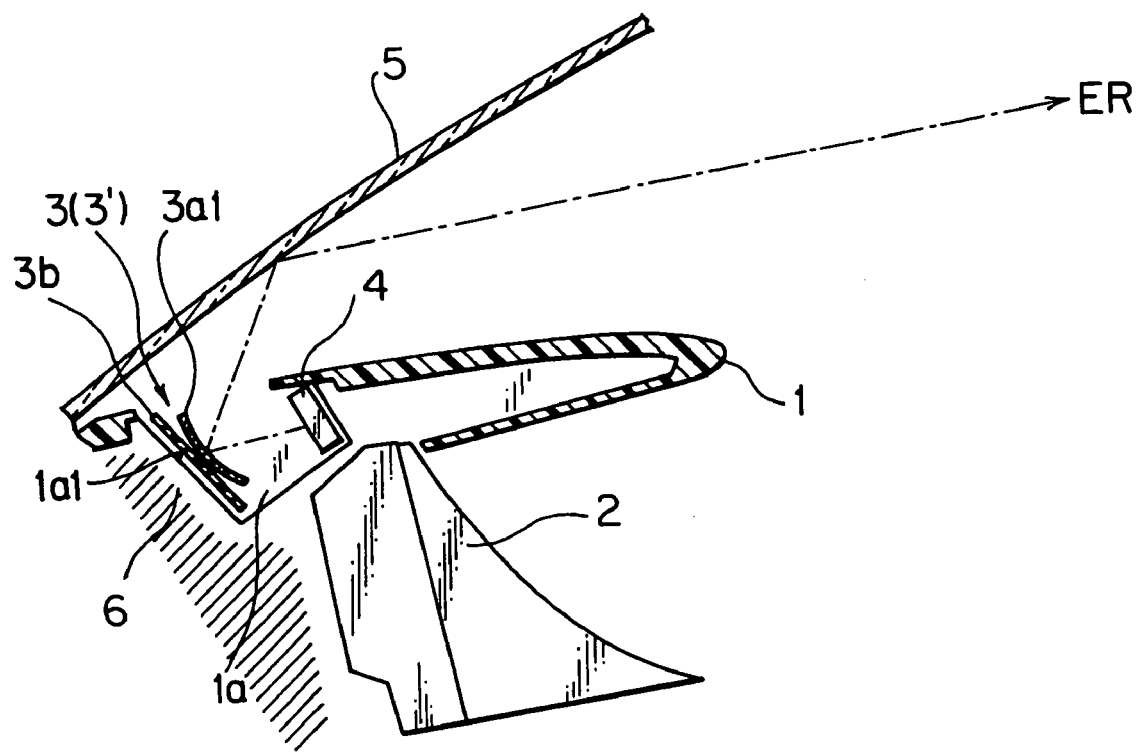
F I G. 1A
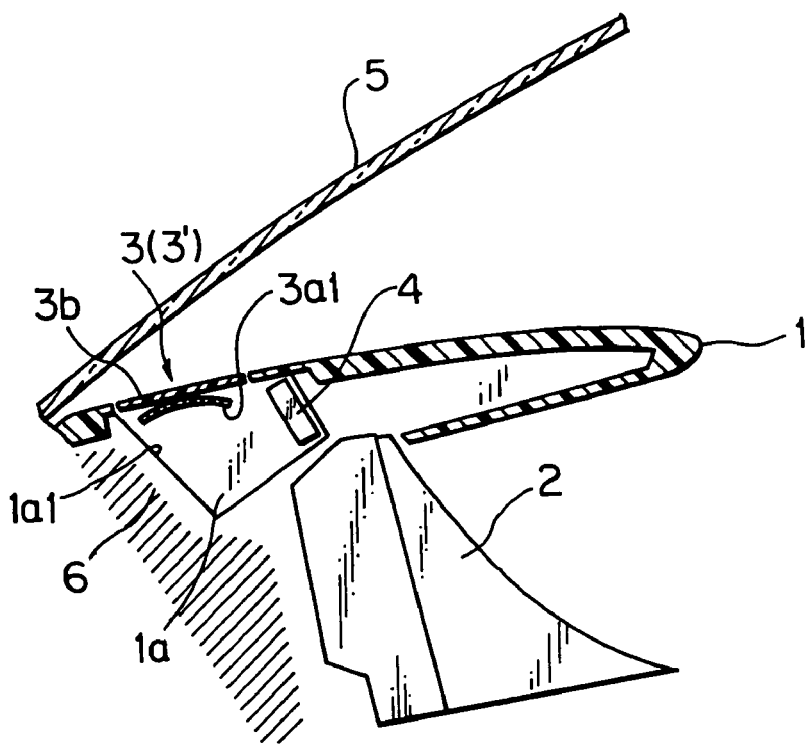
F I G. 1B

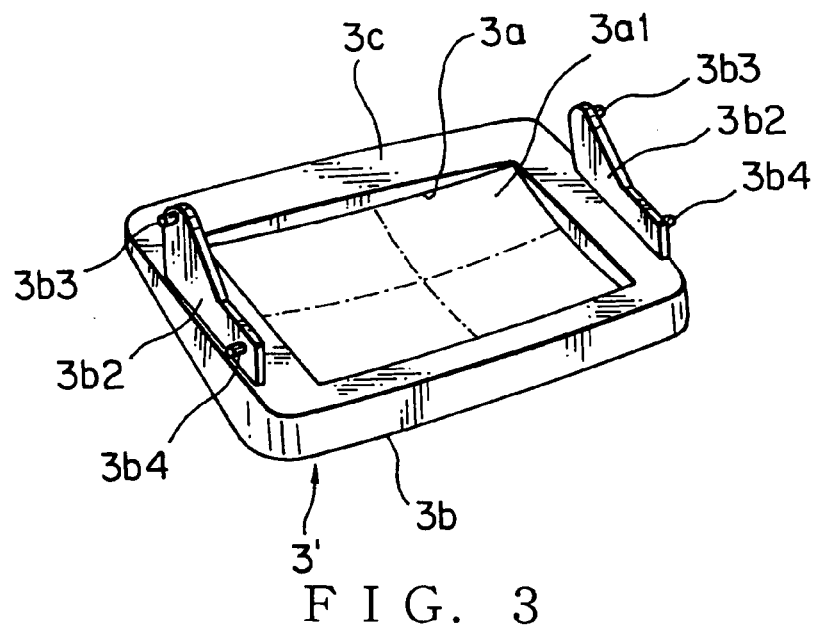
F I G. 3
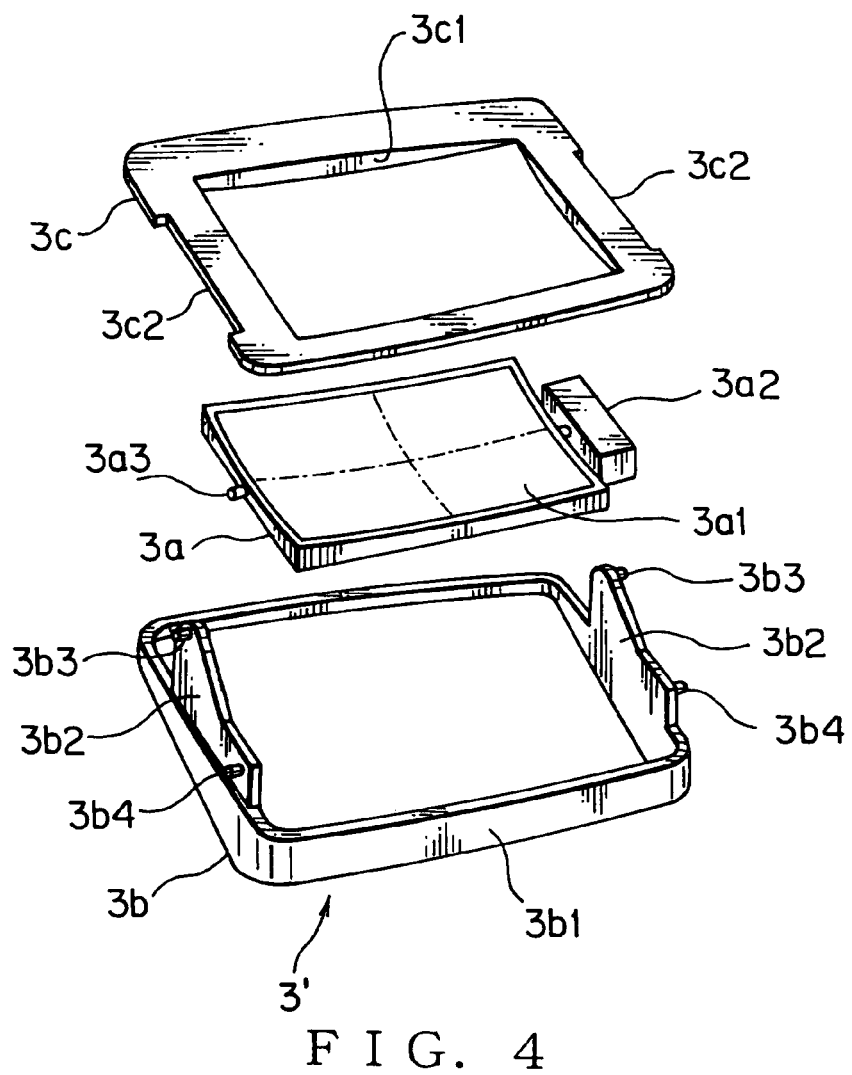
F I G. 4

HEAD-UP DISPLAY APPARATUS AND COVER-MIRROR UNIT USED FOR THE SAME

BACKGROUND OF THE INVENTION

1. Field of the Invention

This invention relates to a display apparatus and an integral cover-mirror unit used for the same to be mounted on a vehicle, and in particular, the display apparatus and the integral cover-mirror unit used for the same, of which mirror to reflect an image displayed on a display unit toward a windshield is movable in up and down directions.

2. Description of the Related Art

Recently, a head-up display apparatus, in which an image of a display unit buried under an instrument panel is reflected by a mirror toward a windshield to be visible to a vehicle driver, has been mounted on a vehicle. Such a head-up display unit is often equipped with a retractable cover for protecting the display unit from direct sunshine, dust, and the like when not being used.

For example, Patent Document 1 listed below suggests a head-up display apparatus with a open/close shutter in which display unit is exposed outside when being used, and is shielded from outside by the shutter when not being used. In detail, a cover of the head-up display unit is slid and the head-up display apparatus is received in a backside of an instrument panel.

However, a meter is usually arranged in the vicinity of the backside of the instrument panel where the cover is received. In addition, a height of the instrument panel is limited in order not to obstruct a front view of a vehicle driver from a viewpoint of safety. Therefore, preferably, the head-up display apparatus is not disposed in the backside of the instrument panel. Accordingly, for example, as shown in FIGS. 7A to 7E, a configuration having an integrated movable component of a mirror 30a1 and a cover 30b, and not requiring a mirror-receiving space as above described is assumed. FIGS. 7A to 7E show an up-down operation of the movable component of an assumed conventional head-up display apparatus. (Where, examples shown in FIGS. 7A to 7E are not existing published prior art).

As shown in FIGS. 7A to 7E, for allowing an integrated movable component 30' of the mirror 30a1 and the cover 30b to operate up and down, using a rotating shaft AX is generally assumed. Accordingly, as shown in FIG. 7A, the movable component 30' stands along an inner wall of a housing 1a when the head-up display apparatus is in use, for allowing the mirror 30a1 to reflect an image displayed on the display unit 4 toward a windshield 5.

When a switching operation for transforming from this in-use position to a non-use position is done, the movable component 30' is rotated to lie down by a switching mechanism about the rotating shaft AX sequentially through positions shown in FIGS. 7B, 7C, 7D and then stopped at the non-use position shown in FIG. 7E. When the switching operation for transforming from this non-use position shown in FIG. 7E to the use position shown in FIG. 7A is done, the movable component 30' is reversely rotated to stand up about the rotating shaft AX.

Incidentally, during the rotation of the movable component 30', the movable component 30' interferes with an inner wall of the housing 1a. However, for convenience's sake, the explanation of FIGS. 7A to 7E disregards the interference.

Patent documents listed below disclose such a head-up display apparatus.

Patent Document 1: JP-A, 2003-237411

Patent Document 2: JP-Y, S62-200040

According to the above, a bottom end of the movable component 30' draws an arc-shaped track TR in FIGS. 7A to 7E with the up/down operation between the in-use and non-use positions. Resultingly, the housing 1a should include a space extended inward from the inner wall thereof for covering the track TR.

Generally, an air duct communicating with an air conditioner, a reinforcing member, and a wire harness are arranged in a space behind the instrument panel 1. However, according to the configuration of the head-up display apparatus described above, since the space at a backside of the housing 1a is invaded, arranging the air duct and the like becomes difficult. Namely, according to the configuration of the head-up display apparatus described above, the space 1a embedded behind the instrument panel 1 becomes large and other components required to be received behind the instrument panel 1 may be obstructed.

In short, recently, many components such as a meter and an air duct have been installed under the instrument panel 1. Therefore, an improvement of space efficiency is an important problem for a vehicle employing a head-up display apparatus having a retractable cover.

Accordingly, an object of the present invention is to provide a head-up display apparatus and a cover-mirror unit used for the same, which improve space efficiency behind an instrument panel.

SUMMARY OF THE INVENTION

In order to attain the object, according to the present invention, there is provided a head-up display apparatus including:

a display unit for displaying a specific image, a mirror for reflecting the image toward a windshield, a housing embedded behind an instrument panel for receiving the display unit and the mirror, and a cover for covering an opening of the housing, wherein the cover and the mirror are integrated with each other as a movable member, wherein the movable member is allowed to stand up when the head-up display apparatus is in use, and to lie down for covering the opening of the housing when the head-up display apparatus is not in use for carrying out an up/down operation.

According to the present invention, since the cover and the mirror are integrated with each other as the movable member, and the movable member is allowed to stand up when the head-up display apparatus is in use, and to lie down for covering the opening of the housing when the head-up display apparatus is not in use, a dedicated space for receiving the mirror is not needed.

In order to attain the object, according to the present invention, there is provided the head-up display apparatus, further including a link mechanism (3b3, 3b4, 3d3, 3d4) for linking the movable member to the housing, wherein a bottom end of the movable member is gradually moved upward when the head-up display apparatus is changed to a state of not in use, or downward when the head-up display apparatus is changed to a state of in use by following an inner wall of the housing through said up/down operation of the movable member.

According to the present invention, the movable member is allowed to stand up along the inner plane wall of the housing when the head-up display apparatus is in use, and to lie down along the same for covering the opening of the housing when the head-up display apparatus is not in use. Particularly, through the down operation of the movable member when the head-up display apparatus is changed to a state of not in use, the bottom end of the movable member is gradually moved upward by following the inner wall of the housing owing to the link mechanism. Therefore, though the movable member stands up along the inner wall of the housing when the head-up display apparatus is in use, the movable member never interferes with the inner wall through the up/down operation.

In order to attain the object, according to the present invention, there is provided the head-up display apparatus, wherein the link mechanism includes: an arc-shaped groove for guiding the bottom end of the movable member to move gradually upward by following the inner wall of the housing; a V-shaped guiding groove for guiding the top end of the movable member to move arcuately around the opening of the housing; and guiding pins for moving through the guiding grooves through said up/down operation.

According to the present invention, since the link mechanism includes: an arc-shaped groove for guiding the bottom end of the movable member to move gradually upward by following the inner wall of the housing; a V-shaped guiding groove for guiding the top end of the movable member to move arcuately around the opening of the housing; and guiding pins for guiding through the guiding grooves, size and weight of the head-up display apparatus are regulated.

In order to attain the object, according to the present invention, there is provided the head-up display apparatus, wherein the guiding pins are mounted on the movable member, and the guiding grooves are formed on the housing.

According to the present invention, since the guiding pins are mounted on the movable member, and the guiding grooves are formed on the housing, the movable member is simplified.

In order to attain the object, according to the present invention, there is provided the head-up display apparatus, wherein said housing embedded behind the instrument panel is small enough to allow components to be arranged at a backside of the inner wall thereof.

According to the present invention, the housing embedded behind the instrument panel is small enough to allow components to be arranged at a backside of the inner wall thereof. The downsizing of the housing described above allows this feature.

In order to attain the object, according to the present invention, there is provided the head-up display apparatus, further including a view area adjusting mechanism integrated with the movable member for adjusting an angle between the mirror and the view area corresponding to a height of the view area of a vehicle driver seated on a driver's seat.

According to the present invention, the view area adjusting mechanism adjusts the angle of the mirror corresponding to the height of the view area of a vehicle driver seated on a driver's seat. Particularly, since the view area adjusting mechanism is further integrated with the movable member formed integrally by the mirror and the cover, once the angle adjustment is completed, no further angle adjustment is needed at each up/down operation.

In order to attain the object, according to the present invention, there is provided a cover-mirror unit used for a head-up display apparatus which is embedded behind an instrument panel and includes a housing receiving a display unit for displaying a specific image, said cover-mirror unit including:

a movable member formed integrally of a mirror for reflecting the image toward a windshield, and a cover for covering an opening of the housing, said movable member standing up when the head-up display apparatus is in use, and lying down to cover the opening of the housing when the head-up display apparatus is not in use for carrying out an up/down operation; and a fixed member fixed on a flat inner wall of the housing, and having a driving mechanism for driving the movable member.

According to the present invention, after the cover-mirror unit is attached to the housing, the movable member formed integrally by the mirror and the cover is allowed to stand up and lie down to cover the opening of the housing when the head-up display apparatus is not in use, thereby a dedicated space for receiving the mirror is not needed.

In order to attain the object, according to the present invention, there is provided the cover-mirror unit, further including a link mechanism for linking the movable member to the housing, wherein through the up/down operation, a bottom end of the movable member is gradually moved by following an inner wall of the housing upward when the head-up display apparatus is changed to a state of not in use, or downward when the head-up display apparatus is changed to a state of in use.

According to the present invention, after the cover-mirror unit is attached to the housing, the movable member is allowed to stand up along the inner plane wall of the housing when the display apparatus is in use, and to lie down along the same for covering the opening of the housing when the display apparatus is not in use. Particularly, through the down operation of the movable member when the head-up display apparatus is not in use, the bottom end of the movable member moves gradually upward by following the inner wall of the housing owing to the link mechanism. Therefore, though the movable member standing up along the inner wall of the housing when the head-up display apparatus is in use, the movable member never interferes with the inner wall through the up/down operation.

BRIEF DESCRIPTION OF THE DRAWINGS

FIGS. 1A and 1B are schematic views respectively showing an embodiment of a head-up display apparatus in in-use and non-use positions according to the present invention;

FIG. 3 is a perspective view showing a movable member of the cover-mirror unit;

FIG. 4 is an exploded perspective view showing the movable member of the cover-mirror unit;

DESCRIPTION OF THE PREFERRED EMBODIMENTS

Figure 2:
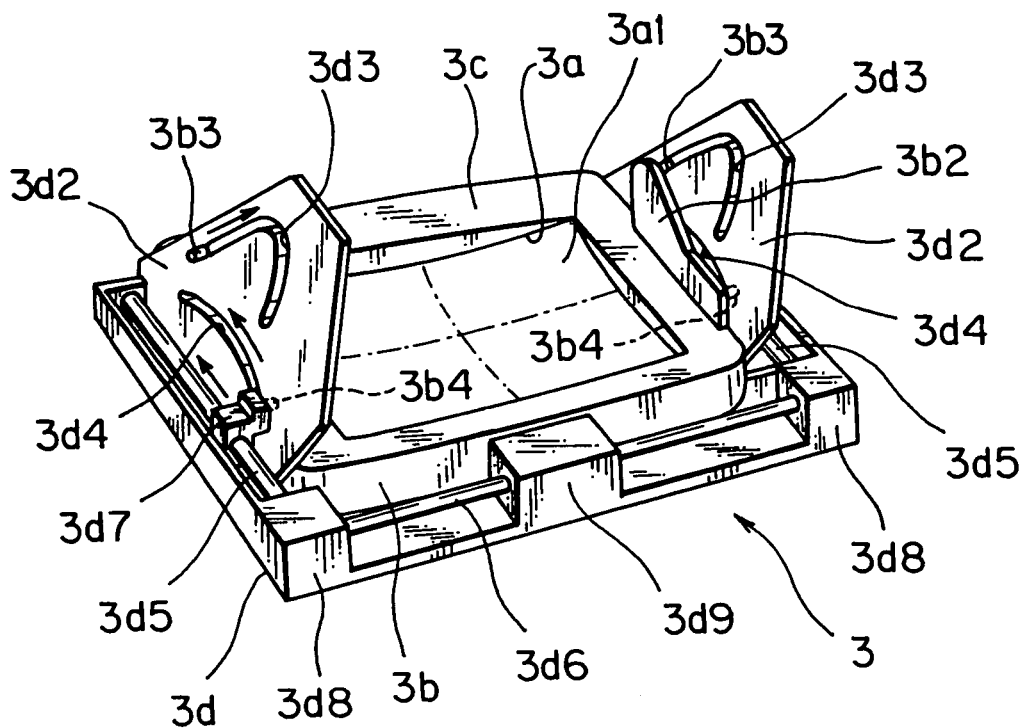
FIG. 2 is a perspective view showing a cover-mirror unit in the in-use position.

An embodiment according to the present invention will be described below with reference to figures. First, a head-up display apparatus according to the embodiment of the present invention will be explained schematically. FIGS. 1A and 1B show respectively a head-up display apparatus in in-use and non-use positions according to the embodiment of the present invention.

As shown in FIG. 1A, a combination meter 2 formed integrally of a speedometer and a tachometer is mounted on an instrument panel 1 disposed at a front side of a vehicle. A housing 1a of the head-up display apparatus of the present invention is embedded behind the instrument panel 1. Basically, inner walls of the housing 1a form a flat box shape of which upper wall is open. A display unit 4 made of a liquid crystal display for displaying a specific image is attached to the housing 1a. A cover-mirror unit 3 is so disposed as to face an inner wall 1a1 of the housing 1a opposed to a screen of the display unit 4 when the head-up display apparatus is in use. Basically, a movable member 3' of the cover-mirror unit 3 is formed integrally of a magnifying mirror 3a1 (hereunder simply referred to as "mirror") and a cover 3b for covering the instrument panel 1. More precisely, the movable member 3' further includes a bezel 3c explained later with FIG. 2. Incidentally, the cover-mirror unit 3 includes a driving mechanism for driving the cover-mirror unit 3 and a fixed member fixed to the housing fixing 1a, both of which will be also explained later with FIG. 2.

The movable member 3' of the cover-mirror unit 3 stands up in the housing 1a when the head-up display apparatus is in use as shown in FIG. 1A, and lies down and covers the opening of the housing 1a so as not to interfere with anything when the head-up display apparatus is not in use as shown in FIG. 1B.

In other words, as shown in FIG. 1A, when the head-up display apparatus is in use, an image displayed on the display unit 4 is reflected by the standing mirror 3a1 to the windshield 5 and reflected again toward a view area of a seated vehicle driver. Thus, the driver can see both a forward view through the windshield 5 and the image reflected by the windshield 5 simultaneously. On the other hand, when the head-up display apparatus is not in use as shown in FIG. 1B, the beam path is broken, and the movable member 3' lies down and covers the opening of the housing 1a so that the cover-mirror unit and the instrument panel 1 are arranged in the same plane.

Figure 5:
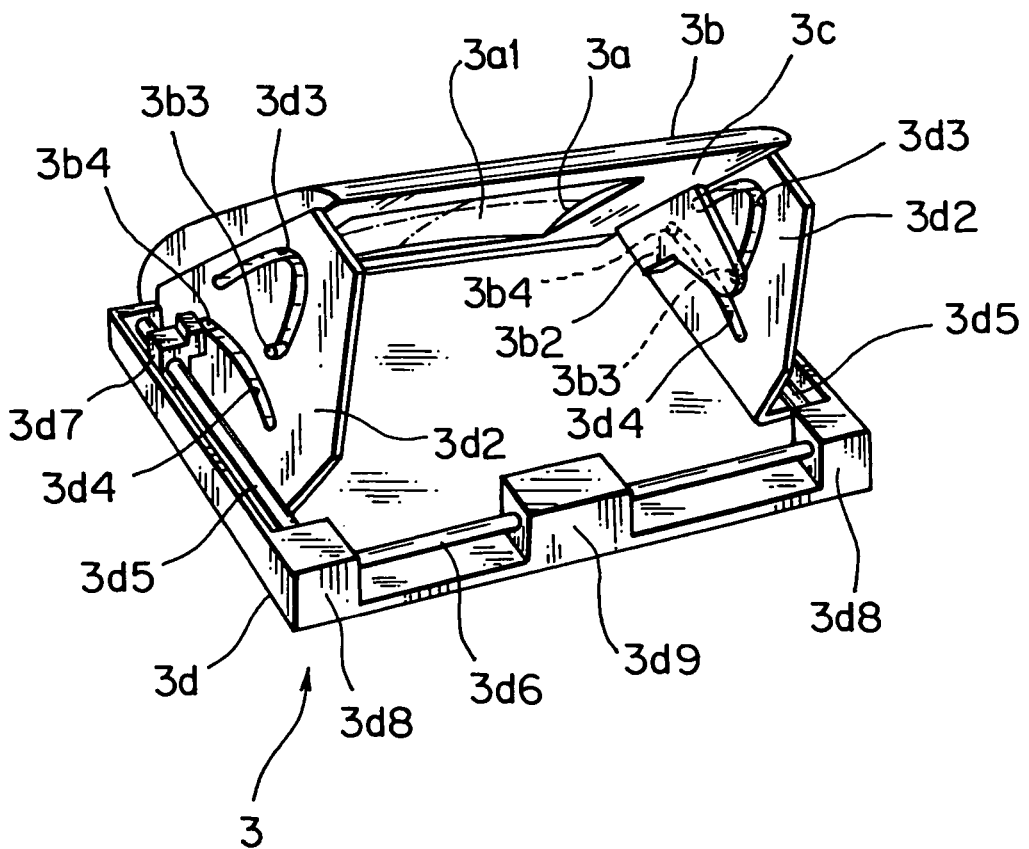
FIG. 5 is a perspective view showing the cover-mirror unit in the non-use position.

Next, a constitution of the cover-mirror unit of the head-up display apparatus according to the first embodiment of the present invention will be explained with FIGS. 2 to 5. FIG. 2 is a perspective view showing a cover-mirror unit in an in-use position. FIG. 3 is a perspective view showing a movable member of the cover-mirror unit. FIG. 4 is an exploded perspective view showing the movable member of the cover-mirror unit. FIG. 5 is a perspective view showing the cover-mirror unit in a non-use position.

As shown in FIG. 2, the cover-mirror unit 3 includes the movable member 3' and a fixed part 3d fixed to the housing 1a. Said movable member has a mirror 3a, the cover 3b, and the bezel 3c. This cover-mirror unit 3 is mounted in a manner that the fixed part 3d is disposed along the inner wall 1a1 of the housing 1a.

As shown in FIGS. 2 to 4, the mirror 3a included by the movable member 3' has the magnifying mirror 3a1, a motor gearbox 3a2, and a mirror-holder shaft 3a3. The magnifying mirror 3a1 is a rectangular concave mirror. The motor gearbox 3a2 includes a motor and a gear for adjusting a view area. The mirror-holder shaft 3a3 is a rotating shaft for the magnifying mirror 3a1 used for adjusting the view area.

The mirror 3a is caught between the cover 3b and the bezel 3c, and received in the cover 3b. The cover 3b has a shallow dish shape sufficient to receive the magnifying mirror 3a1. A pair of walls 3b2 stands on short sides of the cover 3b. Guiding pins 3b3, 3b4 are projected outward from the walls 3b2 and used in an up/down operation described later. The bezel 3c includes a rectangular window 3c1 corresponding to the magnifying mirror 3a1, and a pair of notches 3c2 respectively corresponding to the pair of walls 3b2.

As shown in FIG. 2, the fixed part 3d has a rectangular frame shape a bit larger than the cover 3b. A pair of walls 3d2 stands on the short side of the fixed part 3d in a manner to catch the pair of walls 3b2 from outside thereof. Guiding grooves 3d3, 3d4 into which the guiding pins 3b3, 3b4 are inserted are respectively formed on the pair of walls 3d2. Each guiding groove 3d3 has a V-shape and each guiding groove 3d4 has an arc shape, and the reason will be explained later with FIGS. 6A to 6E. The guiding pins 3b3, 3b4 and the guiding grooves 3d3, 3d4 constitutes the link mechanism for carrying out the up/down operation according to the present invention.

The fixed part 3d also includes a pair of screwing shafts 3d5, a driving shaft 3d6, a pair of nuts 3d7, a pair of gearboxes 3d8, and a motor gearbox 3d9. The pair of guiding pins 3b4 are respectively fitted into the pair of nuts 3d7 and moved by following the pair of screwing shafts 3d5. Each gearbox 3d8 includes a gear for transmit a rotation of the driving shaft 3d6 to a rotation of the screw shaft 3d5. The motor gearbox 3d9 includes a motor and a gear for the up/down operation. Incidentally, these pairs of the walls, guiding grooves, guiding pins, screw shafts, nuts respectively have the same shapes.

When the switch is on for starting the up/down operation of the movable member 3', the motor in the motor gearbox 3d9 is rotated to rotate the driving shaft 3d6. This rotation of the driving shaft 3d6 is transmitted through the gearboxes 3d8 to the screw shafts 3d5. Then, the nuts 3d7 are moved by following the screw shafts 3d5 in a specific direction. At this time, for moving the movable member 3' smoothly, the motor drives so that the pair of guiding pins 3b4 are moved simultaneously.

According to such an up/down operation of the movable member 3', the cover-mirror unit 3 takes an in-use position shown in FIG. 2 when the head-up display apparatus is in use, and a non-use position shown in FIG. 5 when the head-up display apparatus is not in use. Accordingly, after the fixed part 3d of the cover-mirror unit 3 is mounted on the inner wall 1a1 of the housing 1a, the cover-mirror unit 3 takes a position shown in FIG. 1A when the head-up display apparatus is in use, and a position shown in FIG. 1B when the head-up display apparatus is not in use.

The up/down operation of the movable member 3' of the cover-mirror unit 3 mounted on the housing 1a will be explained with reference to FIG. 6. FIGS. 6A to 6E are explanatory views showing the up/down operation of the movable member according to the embodiment of the present invention.

Figure 6A:
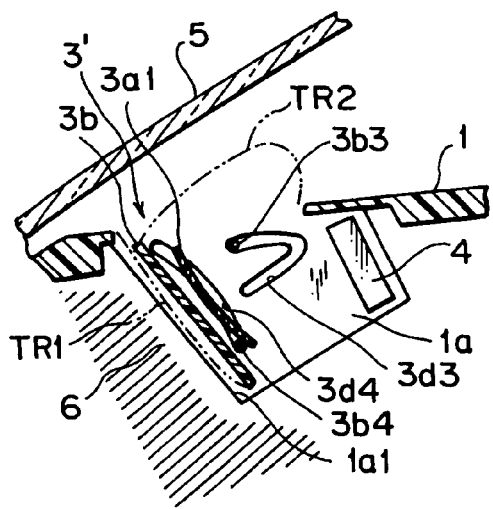
FIGS. 6A to 6E are explanatory views showing an up/down operation of the movable member according to the embodiment of the present invention.
Figure 6B:
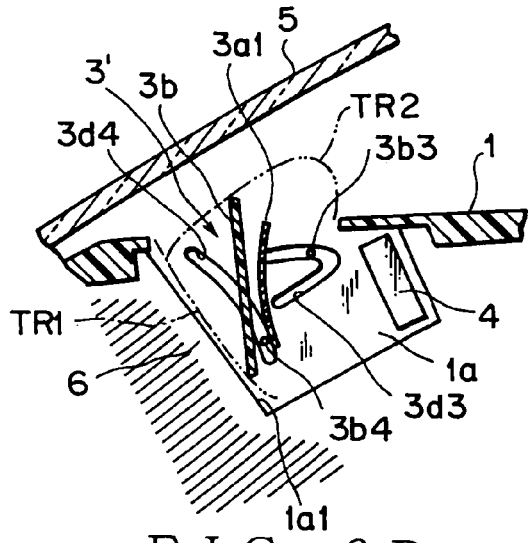
Figure 6C:
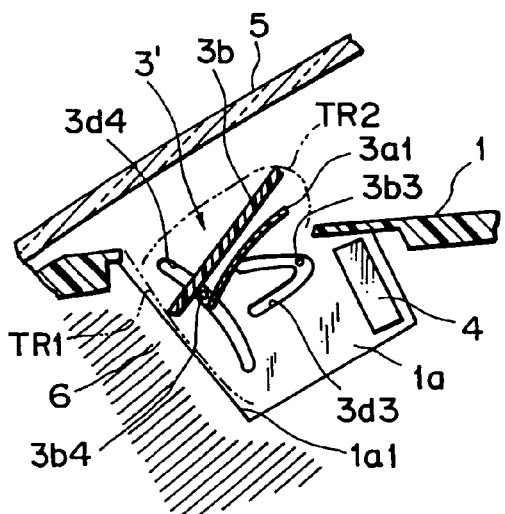
Figure 6D:
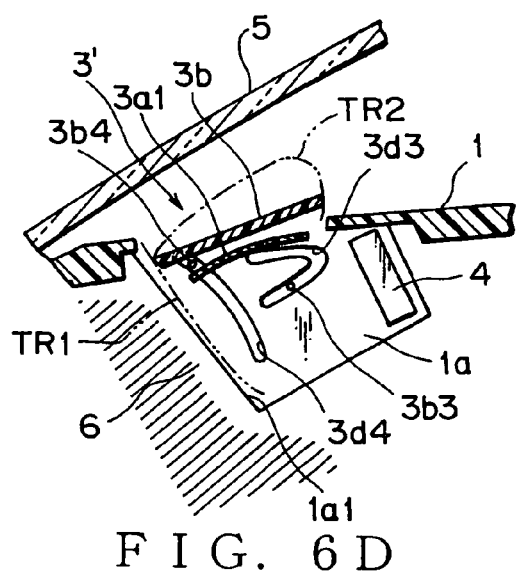
Figure 6E:
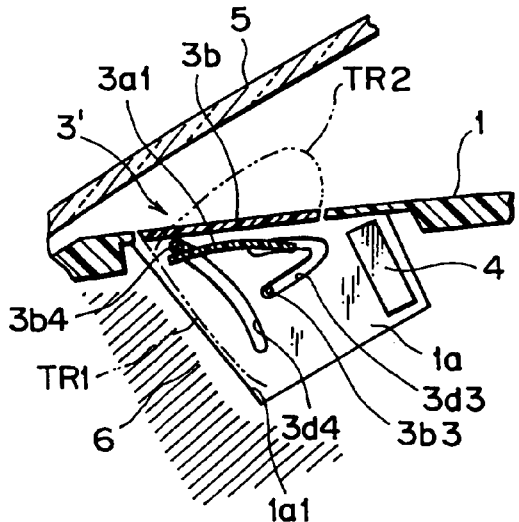
Figure 7A:
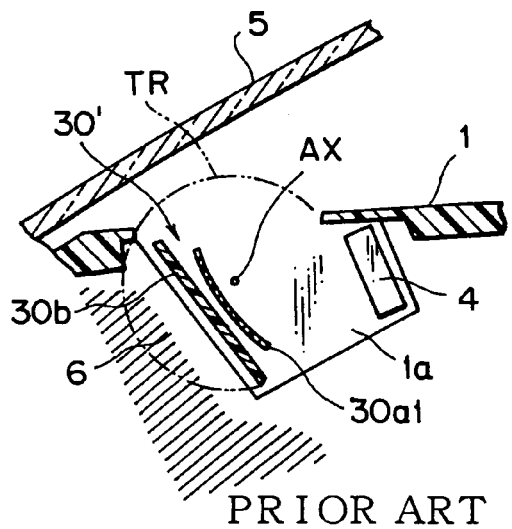
FIGS. 7A to 7E show explanatory views showing the up/down operation of a movable member of an assumed conventional head-up display apparatus.
Figure 7B:
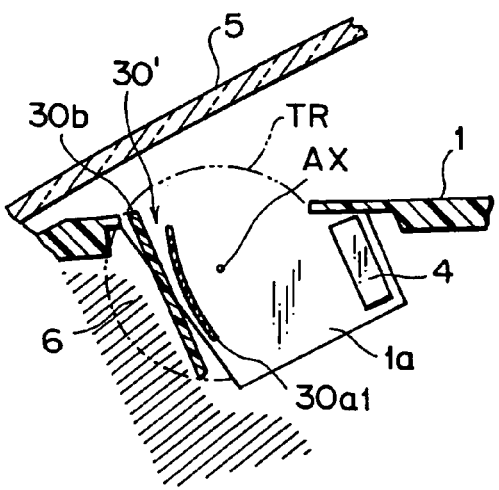
Figure 7C:
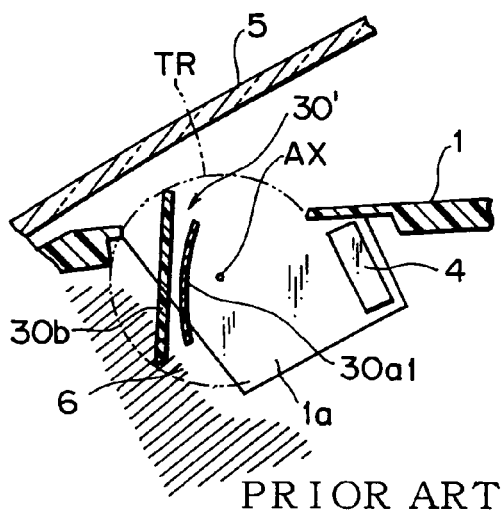
Figure 7D:
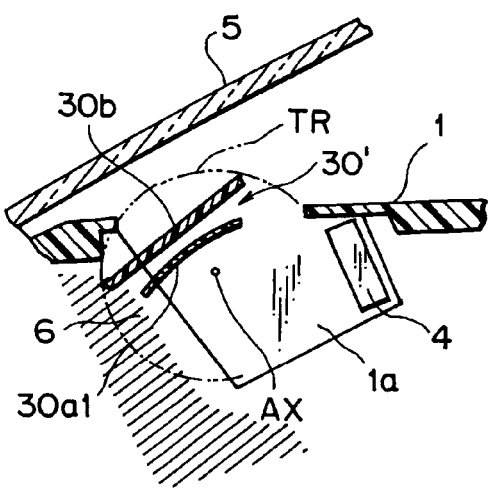
Figure 7E:
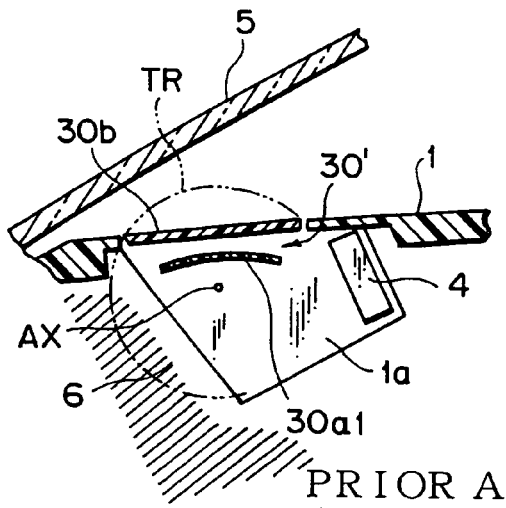

As shown in FIG. 6A, when the cover-mirror unit 3 is in use, the movable member 3' stands up along the inner wall of the housing 1a for making the magnifying mirror 3a1 reflecting the image displayed on the display unit 4 to the windshield 5. From this in-use position, when the switch is on for moving the cover-mirror unit 3 to the non-use position where the cover-mirror unit 3 is not in use, firstly the motor in the motor gearbox 3d9 rotates the driving shaft 3d6. Then, this rotation is transmitted through the gearbox 3d8 to the screw shafts 3d5. Then, the nuts 3d7 are moved by following the screw shafts 3d5 in a direction indicated by an arrow of FIG. 2. Thereby, the guiding pins 3b4, 3b3 are gradually moved by following the guiding grooves 3d4, 3d3 in the direction indicated by an another arrow of FIG. 2. Therefore, as sequentially shown in FIGS. 6B, 6C, 6D, the movable member 3' gradually lies down to stop at the non-use position as shown in FIG. 6E. In addition, when the cover-mirror unit 3 is moved from the non-use position to the in-use position, the cover-mirror unit 3 is moved inversely to gradually stand up.

Through such an up/down operation between the in-use and non-use positions, a bottom end of the movable member 3' (bottom end of the cover 3b) is gradually moved upward (or downward) by following the inner wall 1a1 of the housing 1a, shown as TR1 in FIGS. 6A to 6E. In addition, a top end of the movable member 3' (top end of the cover 3b) is moved arcuately around the opening of the housing 1a, shown as TR2 in FIGS. 6A to 6E. Accordingly, though the movable member 3' stands up along the inner wall 1a1 of the housing 1a when used, the movable member 3' never contact the inner wall 1a1. Therefore, the housing 1a can be downsized so as not to extend toward a space 6 where an air duct, a reinforcing member, a wire harness, and the like are arranged. Namely, space efficiency behind the instrument panel 1 is improved.

According to the embodiment of the present invention described above, the housing can be downsized, and the space efficiency behind the instrument panel can be improved. For example, since the air duct can be housed at a backside of the housing simply, the reinforcing member, a space for receiving the wire harness and the like can be obtained sufficiently behind the instrument panel 1. Further, a visual effect that a movement between the in-use and non-use positions can be seen as a rotation of the movable member 3' of the cover-mirror unit 3 is attained.

Incidentally, the link mechanism, namely, the arrangement and figures of the guiding pins and the guiding grooves disclosed in this embodiment can be varied or changed in a scope of the present invention, and the variations are included in the present invention.

EFFECT OF THE INVENTION

According to the present invention, since a mirror and a cover are integrated as a movable member and the movable member stands up when a head-up display apparatus is in use, and lies down to cover an opening of a housing for carrying out an up/down operation, a dedicated space for receiving the mirror is not needed. Therefore, when employing a head-up display apparatus with a retractable cover in a vehicle or the like, space efficiency behind an instrument panel is improved.

According to the present invention, the movable member stands up when a head-up display apparatus is in use, and lies down to cover an opening of a housing for carrying out the up/down operation. Particularly, through the down operation of the movable member when the head-up display apparatus is changed to a state of not in use, the bottom end of the movable member is gradually moved upward by following the inner wall of the housing owing to the link mechanism. Therefore, though the movable member stands up along the inner wall of the housing when the head-up display apparatus is in use, the movable member never interferes with the inner wall through the up/down operation. Therefore, the housing is downsized, and space efficiency behind the instrument panel is improved.

According to the present invention, since the link mechanism includes: an arc-shaped groove for guiding the bottom end of the movable member to move gradually upward by following the inner wall of the housing; a V-shaped guiding groove for guiding the top end of the movable member to move arcuately around the opening of the housing; and guiding pins for guiding through the guiding grooves, the head-up display apparatus is allowed to be downsized.

According to the present invention, since the guiding pins are mounted on the movable member, and the guiding grooves are formed on the housing, the movable member is simplified and the up/down operation is carried out smoothly.

According to the present invention, the housing embedded behind the instrument panel is small enough to allow components to be arranged at a backside of the inner wall thereof. The downsizing of the housing described above allows this feature. Accordingly, enough room for receiving members to be arranged behind the instrument panel is obtained.

According to the present invention, the view area adjusting mechanism adjusts the angle of the mirror corresponding to the height of the view area of a vehicle driver seated on a driver's seat. Particularly, since the view area adjusting mechanism is further integrated with the movable member formed integrally by the mirror and the cover, once the angle adjustment is completed, no further angle adjustment is needed at each up/down operation. Therefore, an inconvenient angle adjustment work is minimized, and visibility of the image is improved.

According to the present invention, after the cover-mirror unit is attached to the housing, the movable member formed integrally by the mirror and the cover is allowed to stand up and lie down to cover the opening of the housing when the head-up display apparatus is not in use, thereby a dedicated space for receiving the mirror is not needed. Therefore, when employing a head-up display apparatus with a retractable cover in a vehicle or the like, space efficiency behind an instrument panel is improved.

According to the present invention, after the cover-mirror unit is attached to the housing, the movable member is allowed to stand up along the inner plane wall of the housing when the display apparatus is in use, and to lie down along the same for covering the opening of the housing when the display apparatus is not in use. Particularly, through the down operation of the movable member when the head-up display apparatus is changed to a state of not in use, the bottom end of the movable member is gradually moved upward by following the inner wall of the housing by the link mechanism. Therefore, though the movable member standing up along the inner wall of the housing when the head-up display apparatus is in use, the movable member never interferes with the inner wall through the up/down operation. Therefore, the housing is downsized, and space efficiency behind the instrument panel is improved.

What is claimed is:

1. A head-up display apparatus comprising:
    a display unit for displaying a specific image,
    a mirror for reflecting the image toward a windshield,
    a housing embedded behind an instrument panel for receiving the display unit and the mirror, the housing having an inner wall,
    a cover for covering an opening of the housing,
    wherein the cover and the mirror are integrated with each other as a movable member, and
    a link mechanism for linking the movable member to the housing, the movable member having a bottom end wherein the movable member is gradually moved upward when the head-up display apparatus is changed to a state of not in use, to cover the opening of the housing, or downward when the head-up display apparatus is changed to a state of in use by following the inner wall of the housing through an up/down operation of the movable member, and wherein said link mechanism includes, an arc-shaped groove for guiding the bottom end of the movable member to move gradually upward by following the inner wall of the housing, and V-shaped guiding groove for guiding the top end of the movable member to move arcuately around the opening of the housing, and guiding pins for moving through the guiding grooves through said up/down operation.

2. The head-up display apparatus as claimed in claim 1, wherein said guiding pins are mounted on the movable member, and the guiding grooves are formed on the housing.

3. The head-up display apparatus as claimed claim 1 wherein said housing is embedded behind the instrument panel and is small enough to allow components to be arranged at a backside of the inner wall thereof.

4. The head-up display apparatus as claimed in claim 1, further comprising a view area adjusting mechanism integrated with the movable member for adjusting an angle between the mirror and the view area corresponding to a height of the view area of a vehicle driver seated on a driver's seat.

5. A cover-mirror unit used for a head-up display apparatus which is embedded behind an instrument panel and includes a housing having an inner wall receiving a display unit for displaying a specific image, said cover-mirror unit comprising:

a movable member having a bottom end formed integrally of a mirror for reflecting the image toward a windshield, and a cover for covering an opening of the housing, said movable member standing up when the head-up display apparatus is being used, and lying down to cover the opening of the housing when the head-up display apparatus is not in use for carrying out an up/down operation and the bottom end of the movable member follows the inner wall of the housing without contact with the inner wall;

a fixed member fixed on a flat inner wall of the housing, and having a driving mechanism for driving the movable member, and a link mechanism for linking the movable member to the housing, and including an arc-shaped groove for guiding the bottom end of the movable member to move gradually upward by following the inner wall of the housing, a V-shaped guiding groove for guiding the top end of the movable member to move arcuately around the opening of the housing, and guiding pins for moving through said up/down operation.

6. The cover-mirror unit as claimed in claim 5, wherein through the up/down operation, the bottom end of the movable member is gradually moved upward when the head-up display apparatus is changed to a state of not in use, or downward when the head-up display apparatus is changed to a state of in use by following an inner wall of the housing.

* * * * *